(12) United States Patent
Thorsell et al.

(10) Patent No.: US 8,525,471 B2
(45) Date of Patent: Sep. 3, 2013

(54) MOVEABLE MAGNET AND PANEL ASSEMBLY USEFUL IN A VEHICLE

(75) Inventors: Roy Thorsell, Clawson, MI (US); Thomas A. Miller, Royal Oak, MI (US)

(73) Assignee: Toyoda Gosei Co., Ltd, Ochiai Haruhi-Nishinomachi, Gun Aichi (JP)

( * ) Notice: Subject to any disclaimer, the term of this patent is extended or adjusted under 35 U.S.C. 154(b) by 285 days.

(21) Appl. No.: 12/970,378

(22) Filed: Dec. 16, 2010

(65) Prior Publication Data

US 2011/0156638 A1 Jun. 30, 2011

Related U.S. Application Data

(60) Provisional application No. 61/290,348, filed on Dec. 28, 2009, provisional application No. 61/290,352, filed on Dec. 28, 2009, provisional application No. 61/326,893, filed on Apr. 22, 2010.

(51) Int. Cl.
*H01M 10/44* (2006.01)
*H01M 10/46* (2006.01)

(52) U.S. Cl.
USPC ........................................... 320/107

(58) Field of Classification Search
USPC .................. 320/107, 108, 114, 115; 307/104
See application file for complete search history.

(56) References Cited

U.S. PATENT DOCUMENTS

| | | |
|---|---|---|
| 5,992,807 A | 11/1999 | Tarulli |
| 6,129,400 A | 10/2000 | Jakubiec et al. |
| 6,149,116 A | 11/2000 | Won |
| 6,155,525 A | 12/2000 | Joanisse |
| 6,203,088 B1 | 3/2001 | Fernandez |
| 6,588,128 B2 * | 7/2003 | Whang ........................ 40/121 |
| 6,761,388 B2 | 7/2004 | Lein et al. |
| 6,888,940 B1 | 5/2005 | Deppen |
| 7,111,883 B1 | 9/2006 | Patel et al. |
| 7,147,259 B2 | 12/2006 | Radu et al. |
| 7,211,986 B1 | 5/2007 | Flowerdew et al. |
| 7,413,229 B2 | 8/2008 | Kukucka et al. |
| 7,429,068 B2 | 9/2008 | Busha et al. |
| 7,772,802 B2 | 8/2010 | Manico et al. |
| 7,812,771 B2 | 10/2010 | Greene et al. |
| 2001/0009057 A1 | 7/2001 | Schlatter et al. |

(Continued)

FOREIGN PATENT DOCUMENTS

| | | |
|---|---|---|
| DE | 10062163 | 6/2002 |
| EP | 2043226 | 4/2009 |

(Continued)

OTHER PUBLICATIONS

Search Report for PCT/US2010/060779 dated Jul. 24, 2011.

*Primary Examiner* — Edward Tso
(74) *Attorney, Agent, or Firm* — The Dobrusin Law Firm, PC

(57) ABSTRACT

A magnet and panel assembly including at least a first panel having a first surface and a second wherein the panel has a configuration such that a magnetic field can extend past the first surface; a first magnetic source located on or near the second surface of the first panel; one or more magnetic source securing features adapted to hold the magnetic source on or near the second surface of the first panel wherein the source securing features are adapted to allow the first magnetic source to articulate in the x and y directions along a plane substantially parallel to the plane of the first panel.

20 Claims, 4 Drawing Sheets

(56) References Cited

U.S. PATENT DOCUMENTS

| | | |
|---|---|---|
| 2003/0047955 A1 | 3/2003 | Bruhnke et al. |
| 2004/0204074 A1 | 10/2004 | Desai |
| 2006/0113810 A1 | 6/2006 | Kuhl |
| 2007/0035917 A1 | 2/2007 | Hotelling |
| 2007/0182367 A1 | 8/2007 | Partovi |
| 2007/0279002 A1 | 12/2007 | Partovi |
| 2007/0290645 A1 | 12/2007 | Boyadjieff et al. |
| 2008/0001572 A9 | 1/2008 | Baarman et al. |
| 2008/0122297 A1 | 5/2008 | Arai |
| 2008/0169910 A1 | 7/2008 | Greene et al. |
| 2008/0211320 A1 | 9/2008 | Cook et al. |
| 2008/0224655 A1 | 9/2008 | Tilley et al. |
| 2009/0033564 A1 | 2/2009 | Cook et al. |
| 2009/0045772 A1 | 2/2009 | Cook et al. |
| 2009/0072784 A1 | 3/2009 | Erickson |
| 2009/0102296 A1 | 4/2009 | Greene et al. |
| 2009/0106567 A1 | 4/2009 | Baarman |
| 2009/0153098 A1 | 6/2009 | Toya et al. |
| 2009/0212637 A1 | 8/2009 | Baarman |
| 2009/0212638 A1 | 8/2009 | Johnson |
| 2009/0212639 A1 | 8/2009 | Johnson |
| 2010/0109445 A1 | 5/2010 | Kurs et al. |
| 2010/0156343 A1 | 6/2010 | Jung |
| 2010/0201189 A1 | 8/2010 | Kirby et al. |
| 2010/0201201 A1 | 8/2010 | Mobarhan et al. |
| 2010/0219183 A1 | 9/2010 | Azancot et al. |
| 2010/0219694 A1 | 9/2010 | Kurs et al. |
| 2010/0219697 A1 | 9/2010 | Azancot et al. |
| 2010/0244584 A1 | 9/2010 | Azancot et al. |
| 2010/0253283 A1 | 10/2010 | Francois |
| 2010/0259401 A1 | 10/2010 | Azancot et al. |
| 2010/0264747 A1 | 10/2010 | Hall et al. |
| 2010/0264871 A1 | 10/2010 | Matouka et al. |
| 2010/0277121 A1 | 11/2010 | Hall et al. |

FOREIGN PATENT DOCUMENTS

| | | |
|---|---|---|
| FR | 2833221 | 6/2003 |
| FR | 2907065 | 4/2008 |
| GB | 2416633 | 2/2006 |
| GB | 2453110 | 4/2009 |
| WO | 02/085672 | 10/2002 |
| WO | 2009/012033 | 1/2009 |
| WO | 2009/040807 | 4/2009 |

\* cited by examiner

MOVEABLE MAGNET AND PANEL ASSEMBLY USEFUL IN A VEHICLE

CROSS REFERENCE TO RELATED APPLICATIONS

This application claims priority from U.S. Provisional Application Ser. No. 61/290,348 filed Dec. 28, 2009 titled "Movable Magnet and Panel Assembly"; from U.S. Provisional Application Ser. No. 61/290,352 filed Dec. 28, 2009 titled "Recharging or Connection Tray For Portable Electronic Devices" and from U.S. Provisional Application Ser. No. 61/326,893 filed Apr. 22, 2010 titled "Recharging or Connection Tray For Portable Electronic Devices", all incorporated herein by reference.

FIELD OF THE INVENTION

The present invention relates generally to a movable magnet and panel assembly, more particularly to a movable magnet and panel assembly that allow the magnet to articulate in the x and y directions along a plane substantially parallel to the plane of the panel.

BACKGROUND OF THE INVENTION

Magnets have been known and may have numerous uses and functions. In recent years, products have been developed that utilize magnets in conjunction with the efforts to provide an electrical power supply and charging function (e.g. induction charging) for any number of electronic devices (e.g. cordless power trays), for example as taught in U.S. Pat. No. 7,211,986; U.S. 2007/0290645; U.S. 2008/0224655. These products and systems function when a properly equipped electrical device (e.g. phone, PDA, tool, adapted for induction charging) are placed in proximity to the magnet (or magnetic source/magnetic field source/induction source) in such a way that induction charging can occur over time (e.g. recharging a rechargeable battery). It is believed that the relative placement of the device, in proximity to the induction source, is important to the function of the charging of the device. It is also believed that keeping the device secured in-place, in proximity to the induction source, over the charging time is important.

SUMMARY OF THE INVENTION

The present invention meets one or more of the above needs by providing a system that is adapted to make placement and securing of devices more user friendly and robust. The present invention may provide for a system that allows a user to place many differently configured devices (e.g. comprised of a ferrous containing metal such as: a note pad, a clip board, a picture holder, a compact disk holder, a waste receptacle) on a panel in a number of positions and to be held in place. It may also allow, in the case of a "charging" system, for induction charging and for securing the device (e.g. electronic devices) to the panel. The present invention may achieve this goal with the combination of a movable magnet and a panel that allows a magnetic field (created by the magnet) to extend past at least a portion of the exterior surface of the panel.

DETAILED DESCRIPTION

Figure 1:
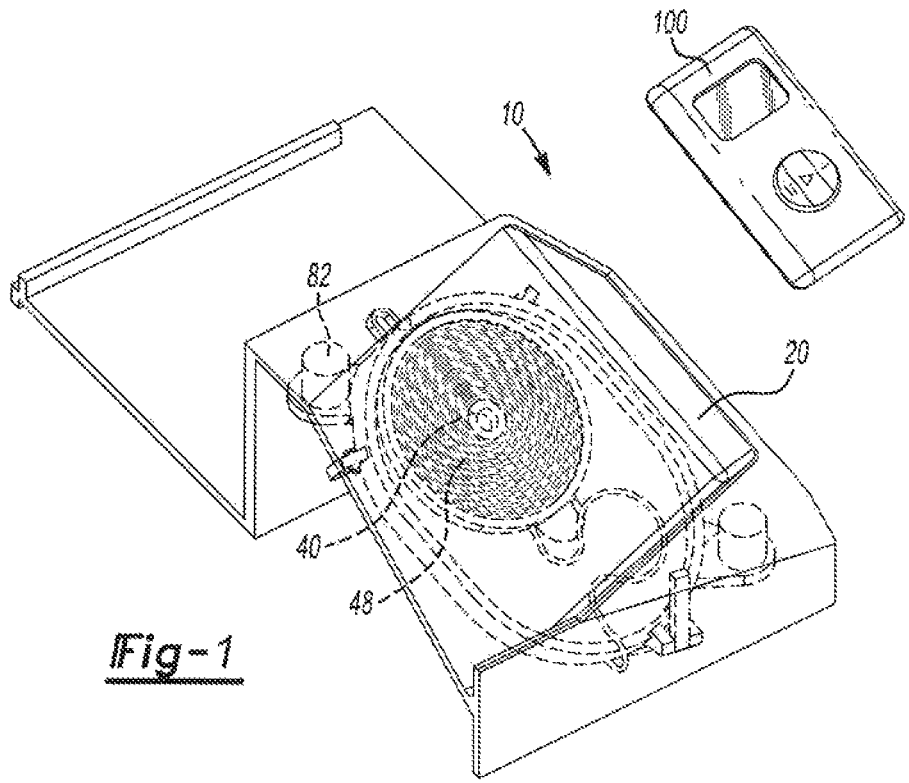
FIG. 1 is a perspective view of an illustrative example of a magnet and panel assembly with the first panel partially transparent.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Accordingly, pursuant to a first aspect of the present invention, there is contemplated a magnet and panel assembly comprising: a) at least a first panel having a first surface and a second surface wherein the panel has a configuration such that a magnetic field can extend past the first surface; b) a first magnetic source located on or near the second surface of the first panel; c) one or more magnetic source securing features adapted to hold the magnetic source on or near the second surface of the first panel wherein the source securing features are adapted to allow the first magnetic source to articulate in the x and y directions along a plane substantially parallel to the plane of the first panel.

The invention may be further characterized by one or any combination of the features described herein, such as: the one or more magnetic securing features is attached by one or more attachment features to the first panel; the assembly further comprises a second panel located near the second surface of the first panel wherein the magnetic securing features is attached to the second panel by one of more attachment features; the second panel is attached to the second surface of the first panel; the second panel defines the range of movement of the first magnet; the magnetic securing features comprises one of more of springs, elastic bands, or armatures; the magnet has sufficient strength and the assembly is arranged to allow an object having a magnet or comprising a part of ferrous containing metal to be held in place on the first surface of the first panel; the first panel is part of an instrument panel, a console, sun visor, a headliner, compartment molded into a headliner, a glove box door, a door assembly, a seat of a vehicle; the object or device is an electronic device, a note pad, a clip board, a picture holder, a compact disk holder, a waste receptacle; the first panel is part of a console; the first panel is integrated into the console and is located so that the driver can view an object held on the panel by the magnet; the first panel is located such that there is tray disposed at the bottom of the first panel adapted to carry the weight of an object held in place by the magnet; a means for recharging a rechargeable battery of an electronic device wherein such recharging means is located in the vicinity of the first magnet such that the magnet is capable of locating the recharging means with respect to the rechargeable electronic device to allow the battery of the rechargeable device to be recharged by the recharging means; the recharging means comprises a connection to the power source of a vehicle, a controller and one or more coils of wire capable of generating a electromagnetic field connected to the controller wherein the first magnet is located within one of the coils of wire.

Accordingly, pursuant to a second aspect of the present invention, there is contemplated a method of securing an object or device within a vehicle comprising the steps of: a) providing an object having a magnet or a part comprised of a ferrous containing metal; and b) contacting the object with the first panel of an assembly according to the first aspect above in the vicinity of the magnetic field of the one of more magnets; and c) allowing the object to be held in place by the magnet.

The present invention is directed to a unique solution for a magnet and panel assembly, where the magnet may be able to move in at least the x and y direction relative to a transverse plane of the panel and such that a magnetic field (created by the magnet) can extend past the exterior surface of the panel. The present invention contemplates that the magnet may be moved by a magnetic source securing feature and/or an interaction between the magnet and some external device (e.g. through magnetic field interactions). In general, the present invention (a magnet and panel assembly 10) includes at least three major components: at least one panel 20; at least one magnetic source 40; and at least one magnetic source securing feature 80. It is also contemplated that the assembly 10 may be functionally two sided (e.g. having two generally opposing panels), and that the magnetic field may extend past the exterior surface of both panels. A number of illustrative examples and preferred embodiments are provided in the FIGS. 1-6 and in the text of the present application.

Panel 20

It is contemplated that the panel 20 generally functions as a barrier, separating the magnetic source 40 from an area outside of the panel. The panel 20 also should be configured such that it allows a magnetic field (e.g. created by the magnetic source 40) to extend past the exterior of the panel 20, at least in localized areas.

The panel 20 may defined as having at least a first panel surface 22, a second panel surface 24 and panel thickness 26. The panel surfaces 22, 24 may have a flat planer profile or may contain one or more contoured areas. The thickness 26 may be uniform or may vary locally (e.g. from about 0.2 mm to about 15.0 mm). It is contemplated that the panel 20 may include through-holes in selected areas or regions.

It is contemplated that the second panel surface 24 may be relatively smooth, such that in the case where the magnetic source 40 is in contact with the surface 24, the source 40 can move (in at least the x and y direction) with relative ease (e.g. with a tangential force of less than about 100 N).

It is also contemplated that at least the exterior surface (e.g. the first surface 22) of the panel 20 have areas that function to create additional friction between the panel 20 and any device 100 that may be placed on it. For example, having a rubber (natural or synthetic) or tacky coating.

The panel 20 may be a unitary structure (e.g. comprising a single layer of material) or be constructed of multiple layers (e.g. a layered assembly of materials). It is contemplated that, at least locally, the panel 20 may contain materials and/or structures that aid in controlling the relative strength or intensity of the magnetic field that can extend past the exterior surface of the panel. Exemplary materials contemplated include: Plastics, rubbers, metals (ferrous and otherwise), and ceramics.

Magnetic Source 40

The magnetic source 40 functions to provide a means for providing the magnetic field that extends past the exterior surface of the panel 20 (e.g. for charging a device 100, for example as taught in WO 2004/038887—incorporated herein by reference). It is contemplated that the source may be a permanent magnet (e.g. an object made from a material that is magnetized and creates its own persistent magnetic field), an electromagnet (e.g. made from a coil of wire which acts as a magnet when an electric current passes through it, but stops being a magnet when the current stops) or a combination of both. It may be of any number of shapes or sizes (e.g. cylindrical, rectangular, disk, square, or polygonical). It may have dimensions, such as lengths and/or widths of about 10 to 50 mm and thicknesses of about 2 to 30 mm.

The magnetic source 40 may also function as a securing means for a device 100 (e.g. a phone, MP3 player, PDA or other electronic device, or any article with a ferrous component, preferably the device has a mass of up to about 1.0 Kg) that is placed on or near (e.g. with about 10.0 mm) of the first panel surface 22. Preferably, the magnet source 40 is capable of preventing the device from becoming dislodged when subjected to a normal or tangential force between about 5 to about 100 N. It is also preferable that the magnetic source 40 be as small and as light weight as possible to accomplish its desired functions.

It is contemplated that the source 40 may be positioned on or near (e.g. within about 15.0 mm) the second surface 24 of the panel 20 (e.g. first panel). It may be secured to the panel 20 via a magnetic source securing feature 80 or to another optional component (e.g. a mounting structure such as a backing plate 60 or a bridge component 70).

Figure 2:
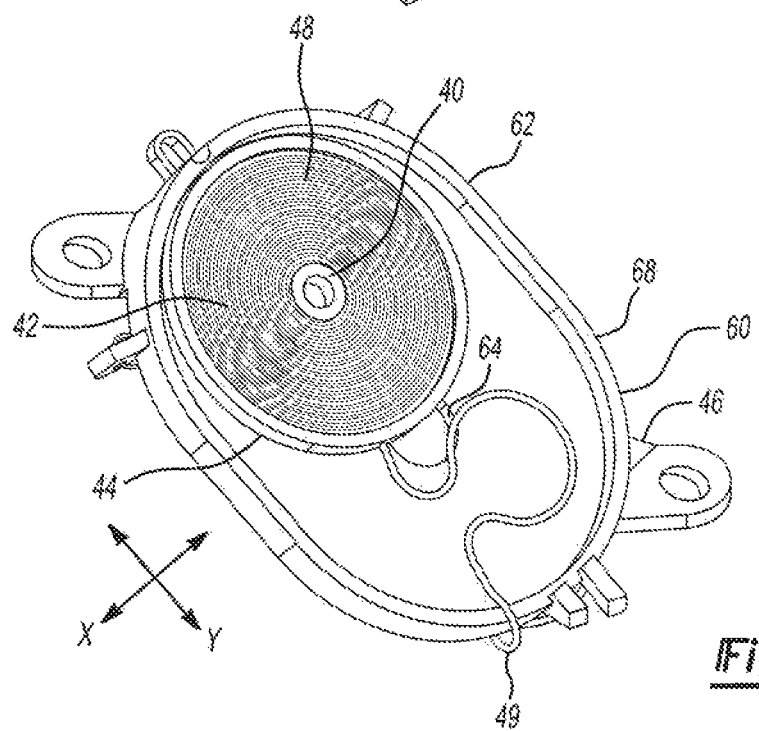
FIG. 2 is a top perspective view of an illustrative example of a magnet and panel assembly with the first panel not shown.
Figure 3:
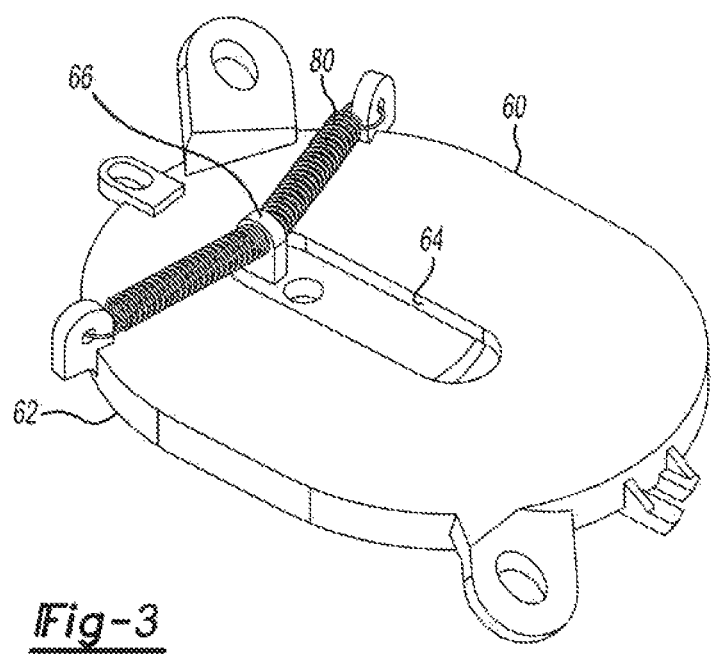
FIG. 3 is a bottom perspective view of an illustrative example of a magnet and panel assembly with the first panel not shown.

In one illustrative example, shown in FIGS. 1-3, the magnet source 40 is an electromagnet that is in the form of a planer disk with a disk diameter 42 of 25 mm and a disk thickness 3 mm of YY. In this example, the panel 20 is not shown, and the backing plate 60 is used to ultimately secure the source 40 to the magnet and panel assembly 10. Also shown in this example, is an electrical supply source 46 (e.g. a wire) that has a length that is sufficient to allow for the movement of the source 40 in the x and y directions.

Figure 4:
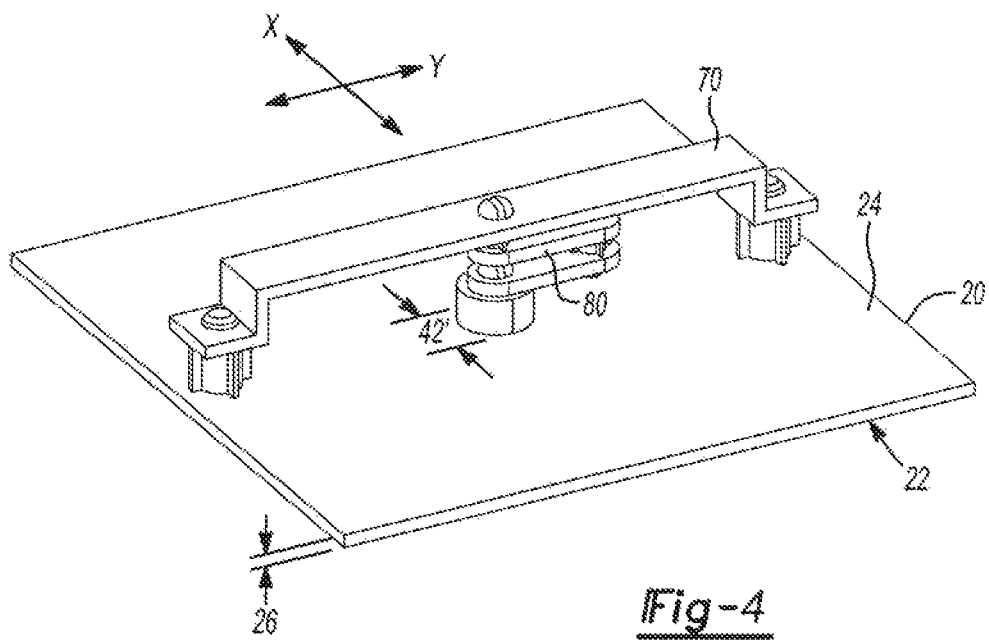
FIG. 4 is a bottom perspective view of an illustrative example of a magnet and panel assembly with a first panel shown.
Figure 5:
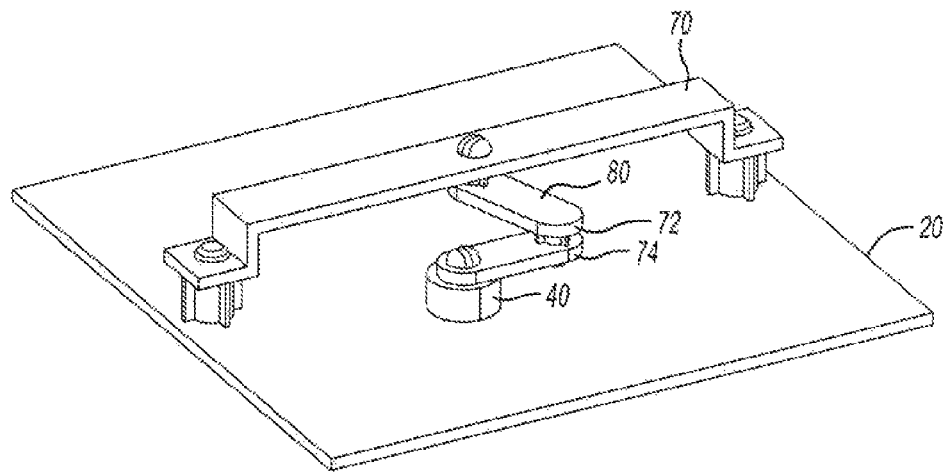
FIG. 5 is another bottom perspective view of an illustrative example of a magnet and panel assembly with a first panel shown.
Figure 6:
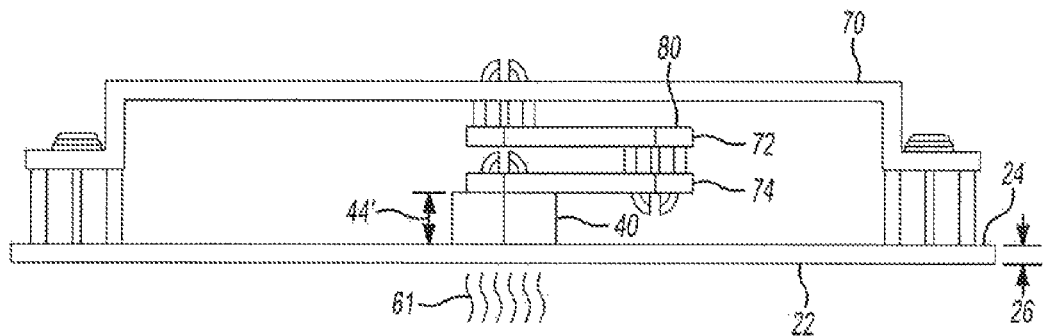
FIG. 6 is side view of an illustrative example of a magnet and panel assembly with a first panel shown.

In another illustrative example, shown in FIGS. 4-6, the magnet source is a permanent magnet that is generally cylindrical in shape, with a cylinder diameter 42' of 12 mm and a cylinder thickness 44' mm' of 12. In this example, the first panel 20 is used to ultimately secure the source 40 to the magnet and panel assembly 10 (via a bridge component 70).

Magnetic Source Securing Feature 80

The magnetic source securing feature 80 functions to hold the magnet source 40 (e.g. ultimately to the magnet and panel assembly 10) and allow for the magnetic source 40 to articulate in the x and y directions along a plane substantially parallel (e.g. plus or minus 10 degrees) to the plane of the panel 20. It is contemplated that the feature 80 may be comprised of primarily springs, elastic bands, or armatures that can move or flex when subjected to a tangential force created by interaction of the magnetic field 61 of the source 40 and any device 100. The feature 80 may be directly or indirectly connected to the first panel 20, a backing plate 60 or some other intermediate structure by means of one or more attachment features 82. It may also be connected to the source 40 via any number of means capable of holding it in place (e.g. mechanical fasteners, adhesive, or some other intermediate structure). It is contemplated that the movement or flexing of the feature 80 allows the source 40 to move to a location that better facilitates providing the magnetic field required to interact with the device and to provide a desired result (e.g. securing and/or charging of the device). Preferably, the tangential force required to move the feature 80 is less than about 300 N, more preferably less than about 150 N and most preferably less than about 100 N.

In one illustrative example, shown in FIGS. 1-3, the feature 80 is a coil spring attached on opposing sides of a backing plate 60 near its top end 62 (spanning therebetween) utilizing one or more attachment features. The source 40 is secured to the feature 80 near the middle of its span, through a slot 64 in the plate 60. This configuration allows for the movement of the source 40 (from its initial position 66) almost anywhere (x and y movement) within the periphery of the slot, when the source 40 is subjected- to a tangential force created by interaction of the magnetic field 61 of the source 40 and any device 100. In this example, the feature 80 also returns the source 40 to its initial position 66 when the force interaction is removed (e.g. the coil spring 80 returns to "un-sprung" state). In this example, the second panel may also function to limit the movement of the at least one magnetic source 40 by use of a wall 68.

In another illustrative example, shown in FIGS. 4-6, the feature 80 is a pair of interconnected armatures (upper arm 72, lower arm 74). The armatures 80 are rotatably attached to a bridge component 70 and the bridge component is attached to the first panel 20. The source 40 is secured to the feature 80 near the end of the lower arm 74. This configuration allows for the movement of the source 40 almost anywhere (x and y movement) within the span of the interconnected armatures 72, 74, when the source 40 is subjected to a tangential force created by interaction of the magnetic field 61 of the source 40 and any device 100. It is also contemplated that the armatures may include geometric features (e.g. tabs, projections, or the like) that may function to limit the relative movement of a given armature (e.g. to less than 360 degrees rotation). It also may include features that allow for one or more of the arms 72, 74 to be "locked" in place, for example for preventing movement during sudden acceleration (or deceleration).

Figure 7:
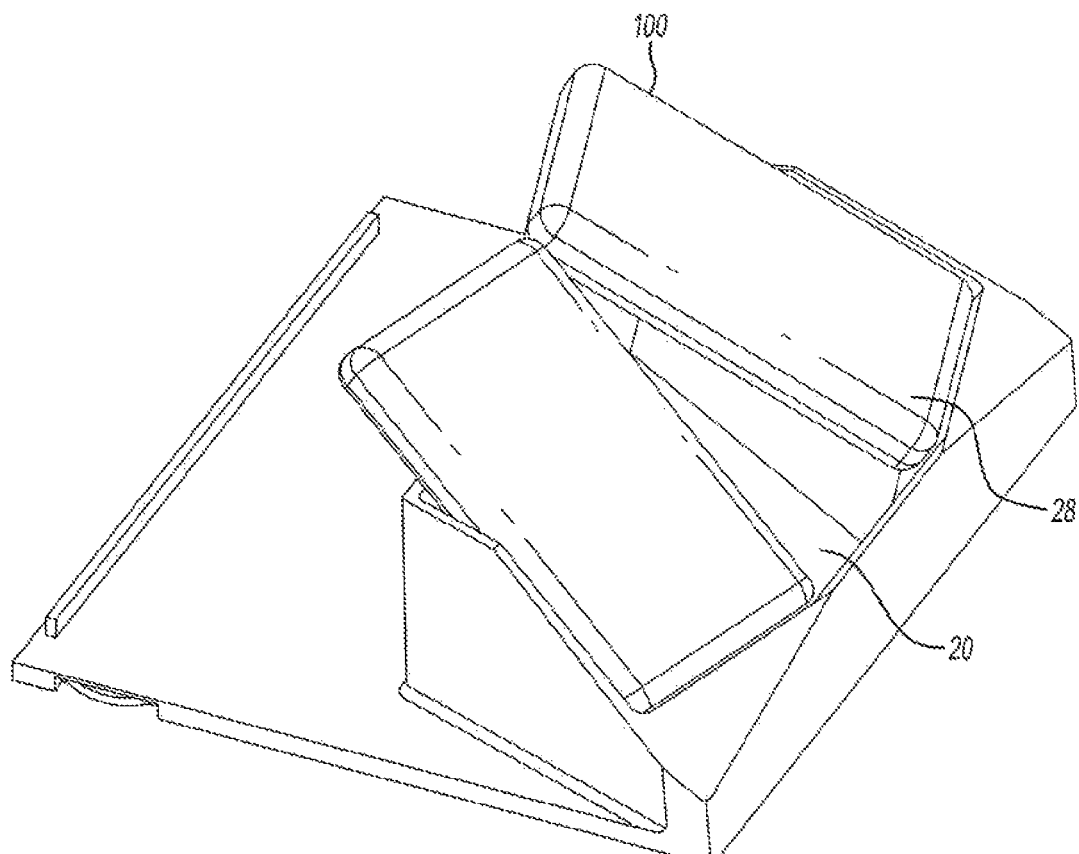
FIG. 7 is a view of an assembly of the invention having a tray to support an object thereon.

The first panel may have connected thereto a tray adapted to carry the weight of an object placed thereupon. The tray can be located in any location with respect to the first panel so as to support the weight of the an object and to help retain the object on the first panel. The tray can be affixed to the first panel or the first panel and the tray can be formed or molded into a unitary element. The angle between the surface of the tray and the first panel is selected to facilitate holding of an object on the first panel, preferably the angle is about 90 degrees. FIG. 7 illustrates one embodiment of a first panel 20 having a tray 28 with an object 100 disposed thereon. The object 100 is held in place by a magnet 40 (not shown in this view). Preferably the tray is located at the bottom of the panel.

The assemblies of the invention may comprise a means for recharging a rechargeable battery. Any means for recharging a battery may be incorporated into the assemblies. In a preferred embodiment the means for recharging a battery is a device that generates an electromagnetic field. Preferably such means is a coil of wires which when electricity is flowed through the coil an electromagnetic field is generated. Objects with batteries which can be regenerated can be equipped with devices which convert electromagnetic field to electricity which can be used to recharge the batteries. These devices are well known in the art. Examples of such systems are disclosed in Baarman et. al. US Patent Publication 2008/0001572; Baarman et. al US Patent Publication 200910212637; Baarman at. al. US 2009/0106567; Arai US Patent Publication 2008/0122297; and Azancot et. al. WO 2009/040807 all incorporated herein by reference. To enable locating the object to be recharged in the proper position, the means for recharging a battery is located near the one or more magnets. The relative relationship of the magnetic source and means for recharging a battery is chosen such that the object with the rechargeable battery will be held in place with respect to the recharging means so that it can be recharged. In a preferred embodiment at least one magnet is located in the center of a coil of wires adapted for generating an electromagnetic field. FIGS. 1 and 2 illustrate one embodiment of the invention wherein the assemblies contain a means for recharging a battery 48 in the form of a coil of wires. Located in the center of the coil of wires is a magnetic source 40 in the form of a magnet. The assembly further comprises a connection 46 between the recharging means and the power source of the vehicle and a controller that controls communication and or the flow of power between the recharging source and the vehicle. FIGS. 1 and 2 show a connection 46 from the recharging means 48 and a power source (not shown).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, dimensions, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially of" to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A magnet and panel assembly comprising:
   a) at least a first panel having a first surface and a second surface wherein the first panel has a configuration such that a magnetic field can extend past the first surface;
   b) a first magnetic source located on or near the second surface of the first panel;
   c) one or more magnetic source securing features adapted to hold the first magnetic source on or near the second surface of the first panel wherein the one or more magnetic source securing features are adapted to allow the first magnetic source to articulate in an x and y directions along a plane substantially parallel to the plane of the first panel,
   wherein the first panel is part of an instrument panel, a console, sun visor, a headliner, compartment molded into a headliner, a glove box door, a door assembly, or a seat of a vehicle.

2. An assembly according to claim 1 wherein the one or more magnetic source securing features are attached by one or more attachment features to the first panel.

3. An assembly according to claim 1 wherein the assembly further comprises a second panel located near the second surface of the first panel wherein the one or more magnetic source securing features are attached to the second panel by one or more attachment features.

4. An assembly according to claim 3 wherein a second panel is attached to the second side of the first panel.

5. An assembly according to claim 3 wherein the second panel defines the range of movement of the first magnetic source.

6. An assembly according to claim 1 wherein the one or more magnetic source securing features comprises one of more of springs, elastic bands, or armatures.

7. An assembly according to claim 1 wherein the first magnetic source has sufficient strength and the assembly is arranged to allow an object having a magnet or a part comprised of ferrous containing metal to be held in place on the first surface of the first panel.

8. An assembly according to claim 7 wherein the object is an electronic device, a note pad, a clip board, a picture holder, a compact disk holder, or a waste receptacle.

9. An assembly according to a claim 1 wherein the first panel is integrated into the console and is located so that a driver can view an object held on the first panel by the magnetic source.

10. An assembly according to claim 9 wherein the first panel is located such that there is a tray disposed at the bottom of the first panel adapted to carry the weight of the object held in place by the magnetic source.

11. An assembly according to claim 1 which further comprises a means for recharging a rechargeable battery of an electronic device wherein such recharging means is located in the vicinity of the first magnetic source such that the first magnetic source is capable of locating the recharging means with respect to the rechargeable electronic device to allow the battery of the rechargeable device to be recharged by the recharging means.

12. An assembly according to claim 11 wherein the recharging means comprises a connection to a power source of the vehicle, a controller and one or more coils of wire capable of generating an electromagnetic field connected to the controller wherein the first magnetic source is located within one of the one or more coils of wire.

13. A method of securing an object within a vehicle comprising
   a) providing the object having a magnet or a part comprised of a ferrous containing metal;
   b) contacting the object with the first panel of the assembly according to claim 1 in the vicinity of the magnetic field of one or more magnets; and
   c) allowing the object to be held in place by the one or more magnets.

14. A method according to claim 13 the assembly further comprises a second panel located near the second surface of the first panel wherein the one or more magnetic source securing feature is attached to the second panel by one of more attachment features and the second panel defines the range of movement of the one or more magnets.

15. A method according to claim 13 wherein the one or more magnetic source securing features comprise one of more springs, elastic bands, or armatures.

16. A method of securing an object within a vehicle comprising:
   a) providing the object having a magnet or a part comprised of a ferrous containing metal;
   b) contacting the object with a first panel of an assembly having
      i) at least the first panel having a first surface and a second surface wherein the panel has a configuration such that a magnetic field can extend past the first surface;
      ii) a first magnetic source located on or near the second surface of the first panel;
      iii) one or more magnetic source securing features adapted to hold the magnetic source on or near the second surface of the first panel wherein the one or more magnetic source securing features are adapted to allow the first magnetic source to articulate in an x and y directions along a plane substantially parallel to the plane of the first panel,
   wherein the first panel is part of an instrument panel, a console, sun visor, a headliner, compartment molded into a headliner, a glove box door, a door assembly, a seat of the vehicle,
   in the vicinity of the magnetic field of one or more magnets; and
   c) allowing the object to be held in place by the one or more magnets.

17. A method according to claim 13 wherein the one or more magnets have sufficient strength and the assembly is arranged to allow an object having a magnet or a part comprised of ferrous containing metal to be held in place on the first surface of the first panel.

18. A method according to claim 17 wherein the object is an electronic device, a note pad, a clip board, a picture holder, a compact disk holder, or a waste receptacle.

19. A magnet and panel assembly comprising:
 a) at least a first panel having a first surface and a second surface wherein the first panel has a configuration such that a magnetic field can extend past the first surface;
 b) a first magnetic source located on or near the second surface of the first panel;
 c) one or more magnetic source securing features adapted to hold the first magnetic source on or near the second surface of the first panel wherein the one or more magnetic source securing features are adapted to allow the first magnetic source to articulate in an x and y directions along a plane substantially parallel to the plane of the first panel;
 wherein the magnetic source has sufficient strength and the assembly is arranged to allow an object having a magnet or a part comprised of ferrous containing metal to be held in place on the first surface of the first panel;
 wherein the object is an electronic device, a note pad, a clip board, a picture holder, a compact disk holder, or a waste receptacle.

20. A method of securing an object within a vehicle comprising:
 a) providing the object having a magnet or a part comprised of a ferrous containing metal;
 b) contacting the object with a first panel of an assembly having
   i) at least the first panel having a first surface and a second surface wherein the first panel has a configuration such that a magnetic field can extend past the first surface;
   ii) a first magnetic source located on or near the second surface of the first panel;
   iii) one or more magnetic source securing features adapted to hold the magnetic source on or near the second surface of the first panel wherein the one or more magnetic source securing features are adapted to allow the first magnetic source to articulate in an x and y directions along a plane substantially parallel to the plane of the first panel,
 in the vicinity of the magnetic field of one or more magnets; and
 c) allowing the object to be held in place by the one or more magnets, wherein the one or more magnets have sufficient strength and the assembly is arranged to allow the object having the magnet or the part comprised of ferrous containing metal to be held in place on the first surface of the first panel, wherein the object is an electronic device, a note pad, a clip board, a picture holder, a compact disk holder, or a waste receptacle.

* * * * *